UNITED STATES PATENT OFFICE.

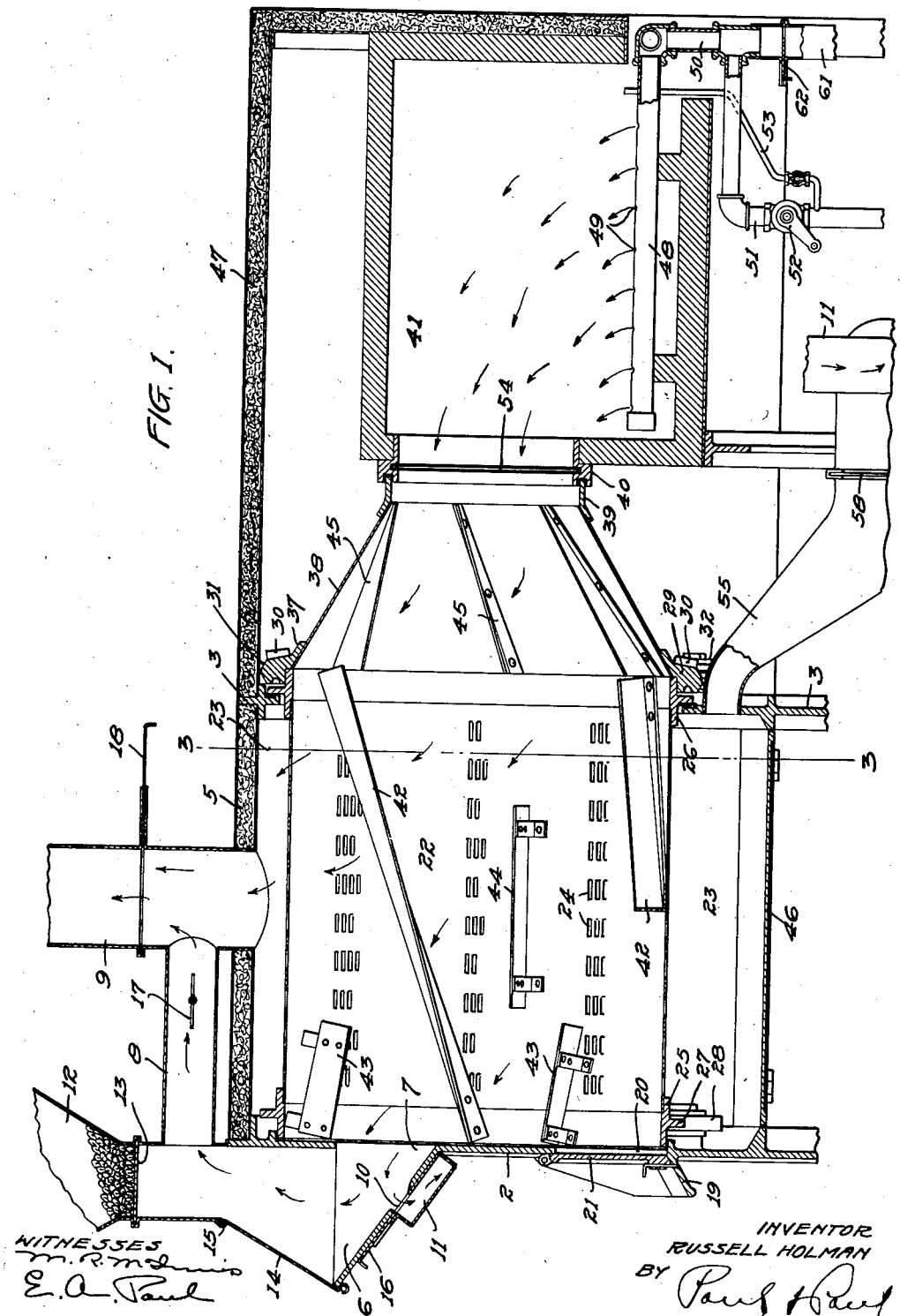

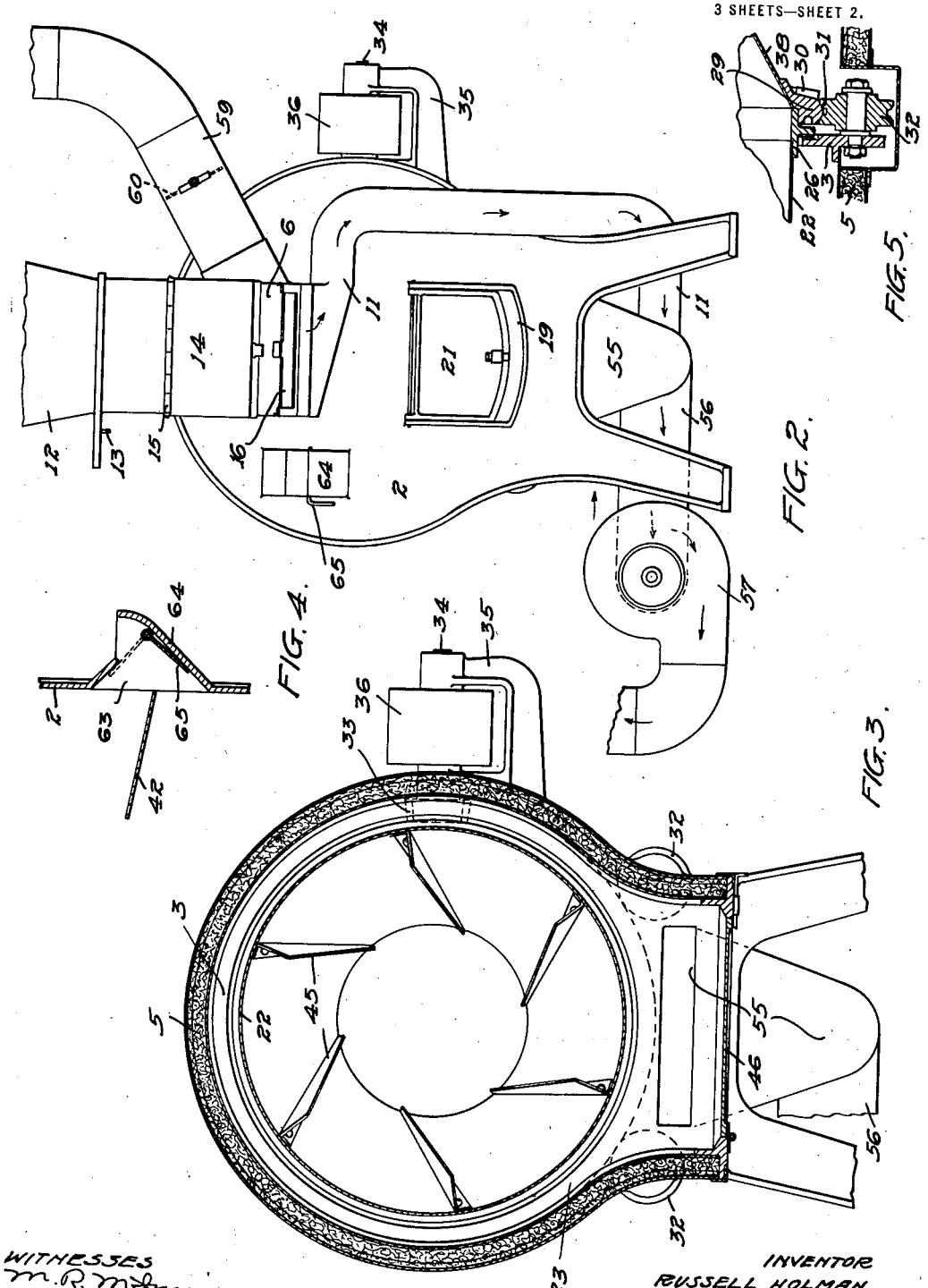

RUSSELL HOLMAN, OF MINNEAPOLIS, MINNESOTA.

ROASTER.

1,274,714. Specification of Letters Patent. Patented Aug. 6, 1918.

Application filed April 25, 1917. Serial No. 164,393.

*To all whom it may concern:*

Be it known that I, RUSSELL HOLMAN, a citizen of the United States, resident of Minneapolis, county of Hennepin, State of Minnesota, have invented certain new and useful Improvements in Roasters, of which the following is a specification.

My invention relates to an apparatus for roasting coffee or cereals, but particularly for roasting coffee.

The primary object of my invention is to improve the coffee roaster shown and described in Letters Patent of the United States, issued to me September 22, 1914, No. 1,111,461, by providing means for conducting currents of cool air through the roaster and the coffee upon the completion of the roasting operation.

A further object is to provide improved means for testing the coffee while roasting.

Other objects of the invention will appear from the following detailed description.

The invention consists generally in various constructions and combinations, all as hereinafter described and particularly pointed out in the claims.

In the accompanying drawings forming part of this specification,

Figure 1 is a longitudinal sectional view of a roaster embodying my invention,

Fig. 2 is a front view of the same,

Fig. 3 is a transverse sectional view taken on the line 3—3 of Fig. 1,

Figs. 4 and 5 are detail views,

Figure 6:
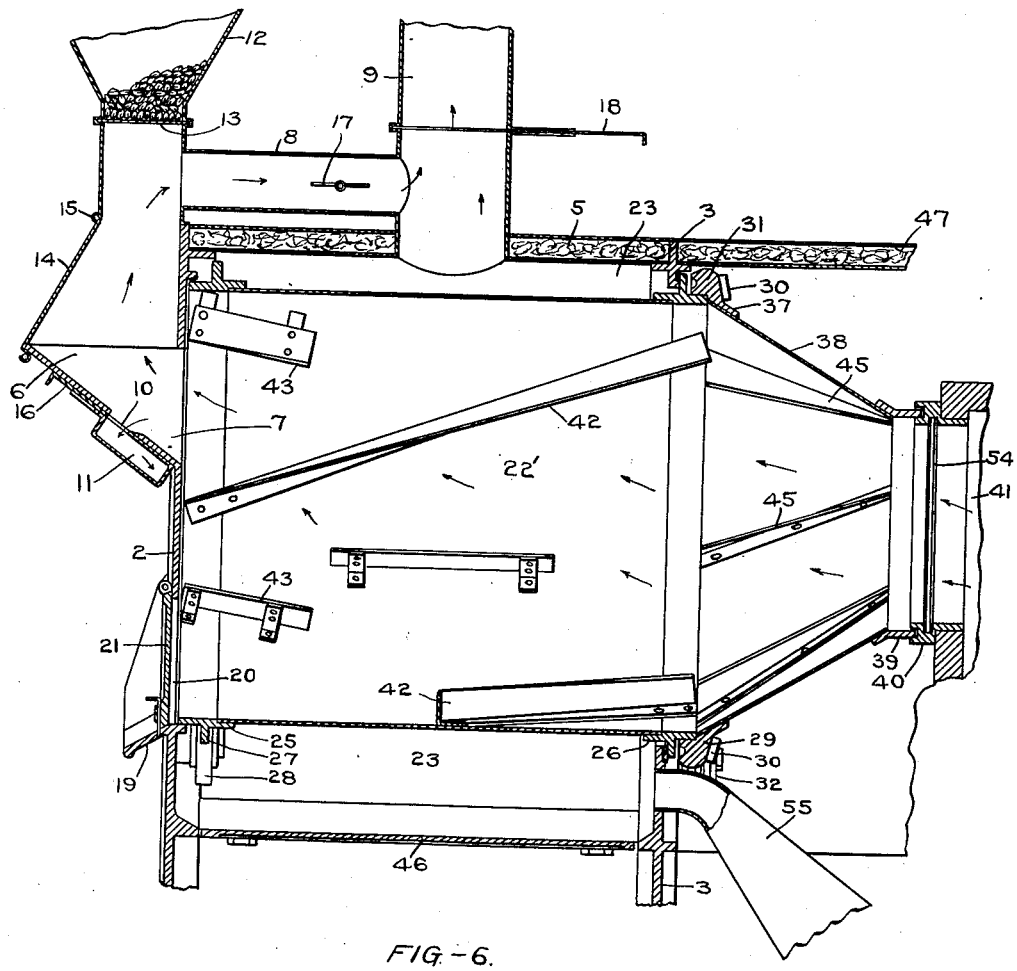
Fig. 6 is a vertical sectional view showing the imperforate cylinder adapting the apparatus for treating grain.

In the drawing, 2 and 3 represent suitable cast heads, connected by suitable spreaders and a casing 5 of asbestos or other suitable non-heat conducting material is secured between said heads and forms with said heads a stationary jacket in which the roaster proper is arranged. The head 2 has a hopper 6 communicating through an opening 7 with the interior of the casing. The hopper also communicates through a pipe 8 with a vent pipe 9 in the top of the casing 5. In the bottom of the hopper 6 I provide an opening 10 communicating with a suction pipe 11. Connected to the hopper 6 is a receptacle 12 for holding coffee. This receptacle is provided with a slide 13 and the hopper has a door 14 hinged at 15 and a slide 16 to close the opening 10 when putting coffee into the receptacle. I also provide dampers 17 and 18 in the vent pipes 8 and 9 for controlling the flow of hot air from the casing during the roasting operation and regulating the circulation of cold air during the process of cooling the coffee.

The slide 16 regulates the suction through the opening 10 in the spout 6 during the roasting operation, when heavier particles, such as chaff from the coffee, are deposited in the hopper 6 and drawn into the pipe 11.

In the lower part of the head 2 is a spout 19 communicating with a discharge opening 20 normally closed by a hinged door 21. When this door is opened the contents may be discharged from the roasting cylinder.

Within the stationary casing is a revolving cylinder 22 spaced from the walls of the chamber to form an annular air circulating passage 23, said cylinder having suitable perforations 24 through which the heated or cold air may circulate freely during either the roasting or cooling operation.

I provide rings 25 and 26 in opposite ends of the cylinder, the former having a flange 27 that rolls on idle rollers 28 secured on the head 2, while the latter has attached to it a gear ring 29 having teeth 30 and a beveled outer face 31 to roll on idle rollers 32 secured in the head 3. The teeth 30 on said ring mesh with the teeth of a bevel gear 33 on a short shaft 34 mounted on a bracket 35 on the head 3 and said shaft is provided with a driven pulley 36.

The ring 29 has a tapered flange 37 to which is secured a cone cylinder 38 having secured to its small end a ring 39, said ring having a free bearing in a stationary ring 40 that is mounted in a wall of the heating chamber 41.

The cylinder 22 is open at each end, one end being adjacent to the hopper 6 and the discharge spout 19 to receive and discharge the coffee. On the inside of said cylinder I mount a series of blades 42, three in number, the angle of these being such as to force the contents in the cylinder toward the wall 2, while the short blades 43, at an opposite angle, work the contents back to the rear or tapered end. I also provide shelves 44 in the center of the cylinder and between the blades 42 and 43 to still further scatter and distribute the contents in the cylinder, and in the rear or tapered end 38 I provide blades 45. As these blades move they will prevent the coffee from coming into the heating chamber as well as they will distribute the hot air coming into the cylinder 22.

These blades, in the operation of the cylinder, will greatly increase the roasting efficiency of the machine. There may be any suitable number of these blades, according to the size of the cone and cylinder.

In the bottom of the casing 5 is a hinged section 46 which will collect the chaff and refuse that work through the openings 24 in the cylinder 22 and allow for the convenient removal from the machine.

The heating chamber 41 is preferably made of fire brick and a casing 47 of non-conducting material forms the outer wall for same and is a continuation of the casing 5. Within the chamber 41 are a series of pipes 48 having perforations 49 therein. These pipes have common connections with a pipe 50 to which the gas is supplied through the piping 51. A suitable shut-off 52 is provided within convenient reach, and a branch pipe 53 leads from the gas supply pipe into a chamber 41 to supply a flame for igniting the gas in the pipes 48. The heat from this chamber 41 will pass through the opening in the ring 40 into the cylinder 22. To shut off the heat from the cylinder 22, I provide a slide or damper 54 in the ring 40. This slide is closed when the cooling process is being performed.

For the purpose of cooling the coffee after the roasting operation, I prefer to provide in the lower end of the head 3 a trunk 55 communicating with the receptacle in the bottom of the chamber 23. The trunk has pipe connections 56 with a suction blower 57 of any suitable construction. I also provide a damper 58 in said trunk to stop the suction while the roasting process is being performed. The hopper 6 has a cold air pipe connection 59 and is also provided with a damper 60. Both the dampers 58 and 60 are closed during the roasting process. I also provide a pipe 61 encircling a fixture to which the gas pipe 50 is connected. The pipe has a damper 62 for regulating the volume of air used for mixing with the gas.

On the front wall 2 and at one side thereof I provide an opening 63 and a hopper 64 provided with a damper 65. Any time during the operation of roasting the coffee, the operator in charge may have convenient access to the coffee for examination. By tilting the damper 65, some of the coffee will be lifted up and held for examination until released, the blades 42 constantly working the coffee against the wall 2 and into the hopper 64.

The machine could be used for roasting grains by using an imperforate cylinder 22 instead of the perforated one, as used for coffee.

In Fig. 6 I have illustrated a sectional view of the apparatus corresponding substantially to the views above described, except that the drum 22' is imperforate, thereby adapting the machine for roasting cereals.

The operation of the machine is as follows: The coffee being delivered to the hopper or receptacle 12 by any suitable means, such as a conveyer, (not shown) the proper amount from said hopper is delivered to the hopper 6 and into the cylinder 22. The cylinder is then revolved, the gas being ignited and the valve 54 opened to allow the heat to pass through the cylinder. The valves 17 and 18 in the pipes 8 and 9 are opened to allow the hot air to pass into the pipe 9, some of the air escaping by means of the hopper 6 and pipe 8, while some passes through the perforations 24 into the chamber 23, thence to the pipe 9, the chaff floating inside of the drum being drawn into the suction pipe 11 through the port 10.

The cooling process is accomplished by shutting the valves 14, 18 and 54, and opening the valves 58 and 60, thereby causing the cold air to be drawn from the pipe 59 through the hopper 6 into the cylinder through the perforations 24 into the chamber 23 and pipe 55 to the blower 57.

The pipe for the chaff collected in the bottom of the hopper communicates with the casing of the fan and may be blown out through the discharge pipe leading from the fan casing to some point distant from the machine. When the valves are adjusted for drawing cool air through the coffee, the passage from the hopper into the chaff pipe will be closed with the others above referred to and the cool air drawn in through the intake pipe and through and around the cylinder and the coffee therein.

In various ways the details of construction herein shown and described may be modified and still be within the scope of my invention.

I claim as my invention:

1. A coffee roaster comprising a casing, a drum mounted for revolution therein, means for passing currents of hot air into and through said drum, a hopper provided at one end of said drum for delivering green coffee thereto, said hopper having a port in its lower wall and a valve therefor, a pipe communicating with said port, and a suction fan for said pipe.

2. A roaster comprising a casing, a roasting drum mounted therein and having open ends, a space being provided between the walls of said casing and said drum, a hopper for delivering the material to be roasted through one end of said drum, a cold air intake trunk communicating with said hopper and through it with the interior of said drum, and a suction fan having a trunk communicating with the space between said drum and casing, whereby currents of cold air may be established into and through said drum and through the material therein.

3. A coffee roaster comprising a casing, a drum mounted for revolution therein, means for delivering green coffee to said drum, means for passing currents of hot air through said drum, the end wall of said casing having a sight opening therein, and a tilting blade mounted in said opening for receiving a sample of the roasting coffee from said drum.

4. A coffee roaster comprising a casing, a drum mounted for revolution therein, means for delivering coffee to said drum, means for passing heated air therethrough, flights mounted on the inner surface of said drum and inclined thereon for receiving the coffee and feeding it endwise of said drum, and a testing shelf provided at one end of said drum and whereto a sample of the roasting coffee is delivered.

5. A coffee roaster comprising a casing, a roasting drum mounted therein, a sight opening provided in the end wall of said casing, a tilting plate mounted in said sight opening and adapted to swing to a position to receive a sample of the roasting coffee and deliver it adjacent to said sight opening.

6. A coffee roaster comprising a casing, a roasting drum mounted therein and having perforations in its walls, space being provided between the walls of said casing and said drum, a hopper for delivering green coffee to said drum, a cold air intake trunk communicating with said hopper and the interior of said drum, and a suction fan having a trunk communicating with the space between said drum and casing, whereby a current of cold air may be established into said drum and through the perforations and the coffee therein.

7. A coffee roaster comprising a casing, a roasting drum mounted therein and having perforations in its walls, a space being provided between the walls of said casing and said drum, a hopper for delivering green coffee to said drum, a suction fan having a casing and an exit trunk leading therefrom, a pipe communicating with the lower wall of said hopper and leading to said suction fan casing, a valve for closing said pipe, a cold air trunk communicating with said hopper and the interior of said drum, and a trunk leading from the space between said drum and casing to said suction fan casing, whereby said fan may be used for drawing the chaff from said hopper and passing currents of cold air through said drum and the coffee therein.

8. A roaster comprising a casing, a roasting drum mounted therein and having perforations in its walls, space being provided between the walls of said casing and said drum, a fan having an intake trunk communicating with the space between said drum and casing, and said drum casing having a cool air intake communicating with the interior of said drum.

9. A roaster comprising a casing, a roasting drum mounted therein, a space being provided between the walls of said casing and said drum, a suction fan having an intake trunk communicating with the space between said drum and casing and said drum casing having a cool air intake communicating with the interior of said drum.

10. A roaster comprising a casing, a roasting drum mounted therein, a space being provided between the walls of said casing and said drum, a fan having an air trunk communicating with the space between said drum and casing and said drum casing having an air passage communicating with the interior of said drum.

In witness whereof, I have hereunto set my hand this 10th day of April 1917.

RUSSELL HOLMAN.